No. 878,098. PATENTED FEB. 4, 1908.
T. E. SUTTON.
MIRROR ATTACHMENT.
APPLICATION FILED MAR. 2, 1907.
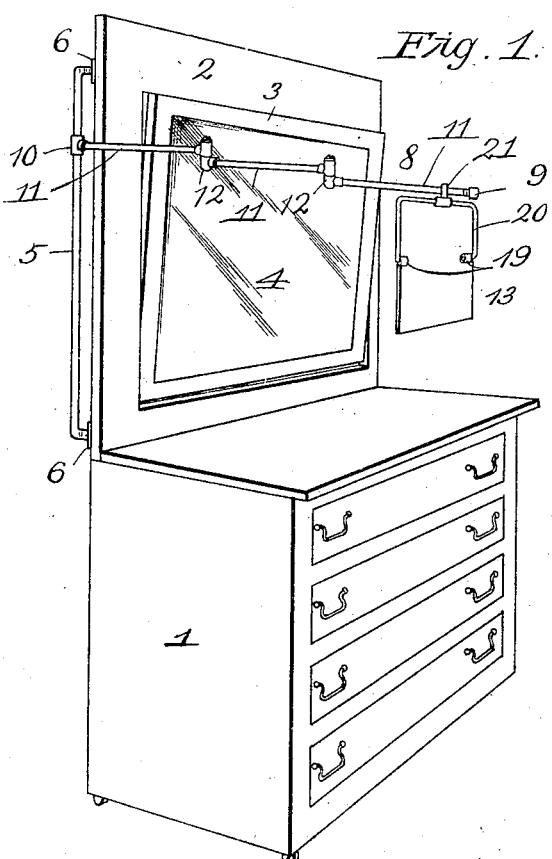
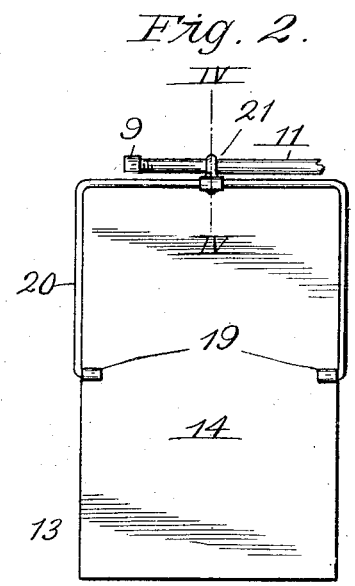
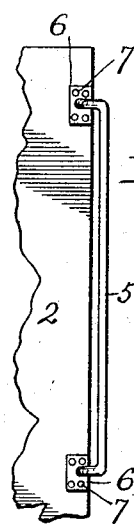
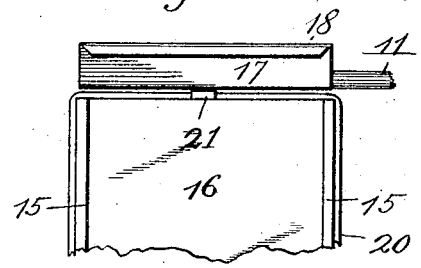
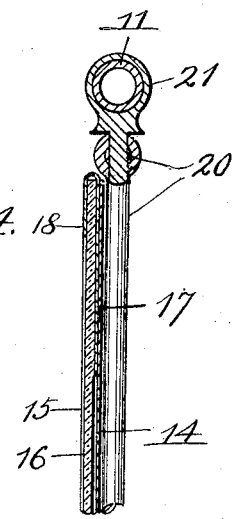
Witnesses:
E. E. Seidelman.
M. Cox.
Inventor:
Thomas E. Sutton
By F. G. Fischer, Atty.

UNITED STATES PATENT OFFICE.

THOMAS E. SUTTON, OF KANSAS CITY, MISSOURI, ASSIGNOR, BY MESNE ASSIGNMENTS, TO HARRY W. SHELLY, OF KANSAS CITY, MISSOURI.

MIRROR ATTACHMENT.

No. 878,098.　　　Specification of Letters Patent.　　　Patented Feb. 4, 1908.

Application filed March 2, 1907. Serial No. 360,258.

*To all whom it may concern:*

Be it known that I, THOMAS E. SUTTON, a citizen of the United States, residing at Kansas City, in the county of Jackson and State of Missouri, have invented certain new and useful Improvements in Mirror Attachments, of which the following is a specification.

My invention relates to mirror attachments, and is an improvement over United States Letters Patent #664,521 of December 25, 1900.

My object is to provide an auxiliary mirror adapted to coöperate with a main mirror in producing reflections, so that a person may readily obtain a front, side, or rear view of the head, body, or dress.

The attachment may be secured to a bureau, or dressing-case containing the main mirror, or it may be attached to any object adjacent a main mirror.

The principal features of the invention are a supporting rod, an extensible bracket adjustably mounted upon said rod, and an auxiliary mirror-containing frame adjustably mounted upon the bracket so that it may be turned in any direction.

Other features of the invention will hereinafter appear, and in order that it may be fully understood, reference will now be made to the accompanying drawing, in which:—

Figure 1 represents a perspective of a bureau provided with my mirror attachment. Fig. 2 is a broken elevation of the extensible bracket with the auxiliary mirror-containing frame depending therefrom, said frame being in rear elevation. Fig. 3 is a broken front elevation of the same. Fig. 4 is an enlarged vertical section on line IV—IV of Fig. 2. Fig. 5 is a broken rear elevation of a bureau with the supporting rod, forming part of my invention, attached thereto.

1 designates a bureau provided at its upper rear portion with a hollow rectangular frame 2, in which a frame 3 is pivotally mounted.

4 designates a main mirror carried by the pivoted frame 3.

5 designates the supporting rod, which when attached to the bureau is bent outwardly beyond the edge of frame 2, as shown in Figs. 1 and 5. The ends of said rod have integral plates 6 for the reception of screws or nails 7, whereby they are attached to the rear of frame 2.

8 designates the extensible bracket which is provided at its forward end with a screwcap 9 and at its rear end with a sleeve 10, arranged to slide and turn upon rod 5, so that said bracket may be adjusted to the desired height. Bracket 8 consists of a plurality of sections 11, connected by swiveljoints 12, so that said bracket may be either folded back out of the way or extended to the desired point in front of the main mirror 4.

13 designates the auxiliary mirror-containing frame constructed, preferably, of sheet metal comprising a back 14 having bottom and side marginal flanges 15, forming a U-shaped housing embracing three sides of the auxiliary mirror 16, which is slidably arranged in said frame and housing so that it may be easily withdrawn therefrom when desired.

17 designates a retaining-strip arranged to fit between the back 14 and the auxiliary mirror, as shown in Fig. 4, and provided at its upper side with a marginal flange 18 adapted to close the open side of the housing and overlap the upper edge of the auxiliary mirror, and thus reliably hold the same within its frame.

Frame 13 is provided with oppositely-disposed bearings 19, which embrace the inturned ends of a bail 20, so that frame 13 may be tipped to any desired angle. Said inturned ends fit friction tight in their bearings so that the auxiliary mirror will remain in its adjusted position.

Bail 20 is provided at its central upper portion with a sleeve 21 pivotally secured thereto, so that said bail may be turned in a horizontal plane, and the sleeve also slidably engages the outer section 11 of bracket 8, its sliding movement being limited by the swivel-joint and the cap. Said sleeve fits friction tight on the section 11 so that the sleeve and bail may be turned in a vertical plane around the section and the mirror may be adjusted above it or at any intermediate position between its highest and lowest points, besides being adjusted on its bearings within the bail—thereby affording considerable adjustment in the vertical position of the mirror without necessarily sliding the sleeve 10 on the rod 5.

Having thus described my invention, what I claim is:—

1. In a device of the character described, the combination with a horizontally swinging bracket; of a mirror containing frame having bearings at its opposite sides, a bail having inturned ends journaled friction tight in said bearings, a sleeve mounted slidably and friction tight on said bracket, and pivotal connections between the sleeve and bail whereby the latter may be adjusted in a vertical plane around the bracket and may be swung on its connections in a plane at right angles thereto.

2. In a device of the character described, the combination with a swinging extensible bracket; of a mirror-containing frame having bearings at its opposite sides, a bail having inturned ends journaled friction tight in said bearings, a sleeve mounted slidably and friction tight on said bracket, and connections between the sleeve and bail whereby the latter may be adjusted in a vertical plane around the bracket.

In testimony whereof I affix my signature, in the presence of two witnesses.

THOMAS E. SUTTON.

Witnesses:
H. W. SHELLY,
M. COX.